UNITED STATES PATENT OFFICE 2,295,980

ESTRADIOL DERIVATIVES AND PROCESS FOR PREPARING SAME

Rezsö Weisz, Budapest, Hungary; vested in the Alien Property Custodian

No Drawing. Application March 2, 1940, Serial No. 321,903

13 Claims. (Cl. 260—397.5)

The present invention relates to and has as its object the production of new estradiol-17-polybasic acid esters, namely, estradiol derivatives in which a polybasic acid is linked at position 17 of estradiol through one of the acid groups of the polybasic acid and another acid group is esterified. In the case of a dibasic acid the new estradiol derivatives will have the following general formula:

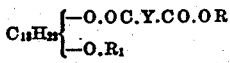

in which Y is a hydrocarbon radical or chain, such as —$CH_2$—, —$CH_2.CH_2$—, —$(CH_2)_n$—, —$CH(CH_3)CH_2$—, etc.; in which R is an acyclic or cyclic hydrocarbon radical, and the group O.OC.Y.CO.OR is in position 17; and in which $R_1$ is a member of the group consisting of hydrogen, or a hydrocarbon radical such as an alkyl radical, an aryl radical, i. e., the benzyl radical or a radical in which one or more aromatic nuclei are substituted in an alkyl group, i. e., diphenyl-methyl or triphenyl-methyl groups, and the radical $R_1$ is in position 3.

A preferred form of my invention includes compounds in which Y is —$CH_2.CH_2$—, in which R is a relatively low molecular weight alkyl group, and in which $R_1$ is hydrogen or the benzyl group. Within this preferred class, a preferred compound is estradiol-17-succinic acid ethyl ester, i. e., the product of the above formula in which Y is —$CH_2.CH_2$—, R is the ethyl group, and $R_1$ is hydrogen.

The present invention relates also to methods of preparing the above referred to new compounds, and has as its object the provision of such a method.

According to the present invention, the new compounds can be obtained in acylating estradiol-3-benzyl-ether by means of an acylating agent, such as an acid chloride of a polybasic acid ester. In the case of an acid chloride of a dibasic acid ester, the acylating agent will have the following general formula:

in which X is a halogen atom, and Y and R are as defined above. For example, in the production of the estradiol-17-succinic acid alkyl ester, the acylating agent may be the acid halide of succinic acid half alkyl esters, such as the acid chloride of succinic acid half ethyl ester. The esterfied products obtained by acylating the estradiol-3-benzyl-ether with the acylating agents above described contain the benzyl group at position 3. Such products contain a protrahated physiological action. Upon the removal of the benzyl group, the resulting estradiol esters, which are esterfield at position 17, have valuable physiological properties. The removal of the benzyl group can be effected preferably by catalytic hydrogenation, in which palladium is preferably used as the catalyst.

Another process for preparing the new products described herein consists in subjecting estradiol-17-polybasic acids such as described in my Patent No. 2,167,132 to an esterification. By this treatment, the free carboxyl group of the estradiol-17-polybasic acid, or one or more in the case of an acid having three or more acid groups, can be esterfied by means of any of different aliphatic alcohols, such as ethyl, methyl, propyl, allyl alcohols, etc.

The following examples are given merely as illustrative:

Example I 1 gram of estradiol-17-succinic acid (described in Patent No. 2,167,132), M. P. 147–151°, is boiled with 20 ccs. of ethanol and 5 ccs. of ethanol containing 33% of HCl, for 3 hours under reflux. Then the reaction mixture is taken up in water and ether, the etheral layer washed several times with aqueous ammonia of 2.5%, then with water until neutral in reaction, and the ethereal solution exaporated. The residue weighs 0.9 gram. It is taken up in 20 ccs. of a mixture of petrol-ether-benzene (1:2). From this solution some estradiol separates which is eliminated by filtration; the filtrate is evaporated to dryness and the residue crystallized from 3–4 ccs. of methanol. The resulting compound is estradiol-17-succinic acid ethyl ester which melts at about 124–125°. The mother liquors yield further quantities.

Example II 4 grams of estradiol-17-succinic acid (M. P. 149–151°) is dissolved in 20 ccs. of absolute alcohol, 0.4 cc. of alcohol containing 34% HCl is added and boiled under reflux for about 2–3 hours. The reaction mixture is then taken up in ether and water and the ethereal layer washed with diluted ammonia. The ethereal layer is now washed with water until neutral in reaction and evaporated to dryness. The remainder is crystallized from aqueous methanol of 80%. The resulting compound is estradiol-17-succinic acid ethyl ester.

Example III 2 grams of estradiol-3-benzyl ether is dissolved in 2 ccs. of dry pyridin and 2 ccs. of acid chloride of succinic acid mono-ethyl ester are added. The mixture is kept for 4 hours at 70°, then taken up in water and extracted by ether. The ethereal layer is evaporated to dryness, the residue taken up in glacial acetic acid and hydrogenated in the presence of palladium at room temperature. After the hydrogen has been adsorbed, the mixture is filtered from the catalyst, the glacial acetic acid evaporated in vacuo, and the remainder taken up in benzene and washed with water. The benzene solution is evaporated to dryness and the remainder crystallized from methanol. The resulting compound is estradiol-17-succinic acid ethyl-ester with an M. P. of 124–126°.

In the manner described in any of the examples, the estradiol derivatives of other polybasic acid esters may be prepared, such as the esters of methyl succinic, malonic, glutaric, or citric acid. Similarly, esters having other hydrocarbon groups may be prepared, such as the methyl, propyl, allyl, butyl, and higher alkyl groups as well as benzyl and other aromatic groups or any acyclic or cyclic group. In the method employing the acylating agent, other halides may be used, such as the acid bromides.

I claim:

1. Estradiol derivatives in which estradiol at position 17 is esterified by a polybasic aliphatic carboxylic acid ester.

2. Estradiol derivatives of the following general formula:

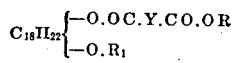

in which Y is an aliphatic hydrocarbon radical; in which R is a hydrocarbon radical, and the group O.OC.Y.CO.OR is in position 17; and in which $R_1$ is a member of the group consisting of hydrogen and a hydrocarbon radical, and the group $O.R_1$ is in position 3.

3. Estradiol derivatives of the following general formula:

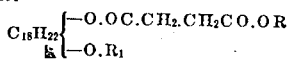

in which R is an aliphatic hydrocarbon radical and the group OC.CH$_2$.CH$_2$CO.OR is in position 17, and in which $R_1$ is a member of the group consisting of hydrogen and the benzyl group and the group $O.R_1$ is in position 3.

4. A product as claimed in claim 3, in which R is the ethyl group.

5. A product as claimed in claim 3, in which R is the propyl group.

6. A new product of manufacture, the estradiol-17-succinic acid ethyl ester.

7. A process for preparing estradiol-17-polybasic acid esters which comprises acylating estradiol-3-benzyl ether by means of an acylating agent of the following general formula:

in which X is a halogen atom, Y is an aliphatic hydrocarbon radical, and R is a hydrocarbon radical.

8. A process for preparing estradiol-17-succinic-esters which comprises acylating estradiol-3-benzyl ether by means of an acylating agent of the following general formula:

in which X is a halogen atom, and R is an aliphatic hydrocarbon radical.

9. A process for preparing estradiol-17-succinic-esters which comprises acylating estradiol-3-benzyl ether by means of acid chlorides of succinic acid half esters.

10. A process for preparing estradiol-17-succinic-esters which comprises acylating estradiol-3-benzyl ether by means of the acid chloride of the succinic acid half ethyl ester.

11. The process of preparing estradiol-17-polybasic acid esters which comprises acylating estradiol-3-benzyl-ether by means of an acylating agent having the following general formula:

in which X is a halogen atom, Y is an aliphatic hydrocarbon radical, and R is a hydrocarbon radical, and removing the benzyl group from the resulting estradiol-3-benzyl-ether-17-polybasic acid ester by catalytic hydrogenation.

12. A process of preparing estradiol-17-succinic acid esters in which estradiol-3-benzyl-ether is subjected to the action of an acylating agent having the following general formula:

in which X is a halogen atom, R is an aliphatic hydrocarbon radical, and removing the benzyl group from the resulting estradiol-3-benzyl-ether-17-succinic ester by catalytic hydrogenation.

13. A process as claimed in claim 12 in which the hydrogenation is effected in the presence of palladium.

REZSÖ WEISZ.